United States Patent
Sawatzky et al.

(10) Patent No.: US 9,034,434 B2
(45) Date of Patent: May 19, 2015

(54) LAMINATE CONCRETE PANELS FOR USE AS COUNTERTOPS OR THE LIKE

(71) Applicants: Madison Timothy John Sawatzky, Altona (CA); Sheridan Riley Mark Sawatzky, Altona (CA); Timothy John Sawatzky, Altona (CA)

(72) Inventors: Madison Timothy John Sawatzky, Altona (CA); Sheridan Riley Mark Sawatzky, Altona (CA); Timothy John Sawatzky, Altona (CA)

( * ) Notice: Subject to any disclaimer, the term of this patent is extended or adjusted under 35 U.S.C. 154(b) by 0 days.

(21) Appl. No.: 14/066,157

(22) Filed: Oct. 29, 2013

(65) Prior Publication Data

US 2014/0220242 A1 Aug. 7, 2014

Related U.S. Application Data

(60) Provisional application No. 61/719,659, filed on Oct. 29, 2012.

(51) Int. Cl.
  *B28B 1/32* (2006.01)
  *B32B 13/00* (2006.01)
  *B28B 19/00* (2006.01)
(52) U.S. Cl.
  CPC . *B28B 1/32* (2013.01); *B32B 13/00* (2013.01); *B28B 19/00* (2013.01)

(58) Field of Classification Search
  CPC .......................................................... B28B 1/32
  USPC ....................................... 427/421.1; 52/592.5
  See application file for complete search history.

(56) References Cited

U.S. PATENT DOCUMENTS

| | | | | |
|---|---|---|---|---|
| 4,824,022 A | * | 4/1989 | Hillemeier et al. | 239/407 |
| 5,330,262 A | * | 7/1994 | Peters | 312/140.4 |
| 7,051,483 B2 | | 5/2006 | Bamford | |
| 8,266,862 B2 | * | 9/2012 | Huang | 52/585.1 |
| 2005/0210822 A1 | * | 9/2005 | Lalonde | 52/742.1 |
| 2006/0191628 A1 | * | 8/2006 | Chapman et al. | 156/250 |
| 2011/0280655 A1 | * | 11/2011 | Maertens et al. | 403/375 |

* cited by examiner

*Primary Examiner* — Nathan T Leong
(74) *Attorney, Agent, or Firm* — Kyle R. Satterthwaite; Ryan W. Dupuis; Ade & Company Inc.

(57) ABSTRACT

Laminate concrete countertops and methods for fabricating same employ a plywood core or substrate onto which concrete layers are applied using spray techniques. In one embodiment, a countertop template is created at the installation site, and subsequently used at a remote fabrication site to cut the core to the customized size and shape before application the sprayed concrete layers. In some embodiments, the core or substrate and overlying concrete layers are left exposed at one or more edges to provide visually contrasting layers creating a unique appearance over conventional countertops. Edge covering pieces visually contrasting the concrete itself can also be installed to further characterize the appearance of the countertop, and may be removably installed to allow swapping out of different edge pieces to reconfigure the countertop appearance over time.

17 Claims, 7 Drawing Sheets

LAMINATE CONCRETE PANELS FOR USE AS COUNTERTOPS OR THE LIKE

CROSS REFERENCE TO RELATED APPLICATIONS

This application claims benefit under 35 U.S.C. 119(e) of Provisional Application Ser. No. 61/719,659, filed Oct. 29, 2012.

FIELD OF THE INVENTION

The invention relates generally to laminate concrete countertops where one or more layers of concrete reside atop a sheet or board of substrate material, and more particularly to such a countertop with unique edge configurations in which the different layers are exposed to provide a unique aesthetic finish at exposed edges of the countertop.

BACKGROUND OF THE INVENTION

Concrete countertops are a known alternative to more common countertop solutions such as natural stone slab countertops and plastic laminate countertops, such as Formica countertops. Concrete countertops are sometimes considered to provide a midrange alternative to low cost plastic laminate and expensive natural stone, such as granite or quartz. Concrete countertops can be cast in place, or prefabricated by being cast in a production setting according to the installation specifications, or being machined to such specifications from a pre-cast slab.

U.S. Pat. No. 7,051,483 of Bamford teaches a laminate concrete panel useful as a counter top. The panel features two distinct concrete layers, an upper one of which is cross cured to a lower concrete layer. The top of the final product features a sealant layer. Some embodiments of the Bamford patent feature a medium density fiberboard (MDF) backing board bonded to the underside of the lower concrete layer as a final step in the fabrication process.

Applicant has developed a new laminate concrete panel with a distinct finished appearance for a countertop or the like, and also new fabrication methods for producing laminate concrete panels. As used herein, the expression countertop encompasses desktops, workbench tops, bathroom vanity tops and table tops.

SUMMARY OF THE INVENTION

According to a first aspect of the invention there is provided a laminate concrete panel supported in an installed position atop a support structure to define a countertop or the like, the laminate concrete panel comprising a laminate body spanning an area bound by a plurality of perimeter edges of said laminate body, the laminate body comprising one or more concrete layers disposed atop an underlying substrate layer formed of a substrate material, wherein at least a portion of each layer of the laminate body is visible at one or more of said perimeter edges that are visibly exposed with the panel in the installed position.

There may be provided a sink-accommodating opening passing through the laminate body for accommodating an undermount sink therebelow, wherein at least a portion of each layer of the laminate body is visible at a perimeter of the sink-accommodating opening.

The laminate body may comprise a respective edge strip running along at least one of the exposed perimeter edges of the laminate body over a topside of the concrete layer or beneath an underside of the substrate layer, said edge strip having a layered configuration comprising at least one additional concrete layer and at least one additional layer of said substrate material, each of which is at least partially visible at an exposed surface of said strip The respective edge strip may be located over the topside of the concrete layer and the exposed surface of said strip may faces inwardly over the concrete layer, or upwardly away from the concrete layer.

Alternatively, the respective edge strip is located beneath the topside of the concrete layer and the exposed surface of said strip faces outwardly from under the substrate layer.

The substrate material preferably comprises wood, and in one preferred embodiment comprises plywood.

The substrate layer may be stained, at least at the exposed edges of the laminate body.

According to a second aspect of the invention there is provided a method of fabricating a laminate concrete panel for use as a countertop or the like, the method comprising the steps of:

(a) forming a laminate body comprising one or more concrete layers disposed atop an underlying substrate layer and spanning an area bound by a plurality of perimeter edges of said laminate body; and (b) leaving the substrate layer of the laminate in a state uncovered by the one or more concrete layers at one or more finished edges that are to be positioned at visible locations when the panel is installed.

Preferably step (a) comprises spraying at least one concrete layer onto a sheet or board of substrate material.

Step (a) may comprise first cutting one or more sheets according to a template that reflects dimensions of a support structure at an installation site where the countertop or the like is to be installed, and then applying to the concrete to the one or more cut sheets and allowing the concrete to cure thereon at a fabrication site that is remote from the installation site.

Alternatively, step (a) may comprise applying concrete to a sheet of substrate material, allowing the concrete to cure on the sheet, and cutting the sheet and the concrete cured thereon into smaller pieces to form multiple ones of said laminate body.

Step (a) may further comprise cutting a respective strip from the laminate body along at least one of the perimeter edges thereof, and mounting the strip to over a topside of the concrete layer or beneath an underside of the substrate layer to follow along one of the perimeter edges of the laminate body.

Step (a) may comprise mounting the strip over the topside of the concrete layer with layers of the strip visible at a side the strip facing inwardly over the concrete layer, or visible at an edge of the strip facing upwardly away from the concrete layer.

Alternatively, step (a) may comprise mounting the strip beneath the underside of the substrate layer with layers of the strip visible at a side the strip facing outwardly from under the substrate layer.

Preferably the method includes applying sealant to the laminate body, including application of sealant to one or more of the perimeter edges that form the one or more finished edges at which the visibly contrasting layers are exposed.

The method may comprise applying a visually distinct covering material over at least a portion of one or both of the concrete and substrate layers of the laminate body at at least one of the one or more finished edges.

The cover material may be applied in a manner also covering a partial area of a topside of the one or more concrete layers to provide an accent area at said topside of the one or more concrete layers.

The method may comprise bending a sheet of the cover material to overlie both the partial area of the topside of the one or more concrete layers and the at least one of the one or more finished edges.

The cover material may be recessed into the topside of the primary concrete layer to lie flush therewith.

The cover material may be applied in a removable manner, for example by magnetic attachment.

According to a third aspect of the invention there is provided a laminate concrete panel for a countertop or the like, the laminate concrete panel comprising a laminate body spanning an area bound by a plurality of perimeter edges of said laminate body, the laminate body comprising one or more primary concrete layers disposed atop an underlying primary substrate layer formed of a substrate material, and a respective edge strip running along at least one of the perimeter edges over a topside of the concrete layer or beneath an underside of the substrate layer, said edge strip having a layered configuration comprising at least one additional concrete layer and at least one additional layer of said substrate material.

At least one of the layers of the edge strip may be visible at an exposed surface of said strip, for example being visible over only a partial portion of the exposed surface of said edge strip, with a remainder of the at least one layer at the exposed surface being covered by a visually distinct cover material applied to the edge strip.

At least one of the primary concrete and primary substrate layers may be visible at the perimeter edge of the laminate body, for example being visible over only a partial portion of the perimeter edge of the laminate body, with a remainder of the at least one of the of the primary concrete and primary substrate layers at the perimeter edge being covered by a visually distinct perimeter cover material applied to the laminate body.

According to a fourth aspect of the invention there is provided a laminate concrete panel supported in an installed position atop a support structure to define a countertop or the like, the laminate concrete panel comprising a laminate body spanning an area bound by a plurality of perimeter edges of said laminate body, the laminate body comprising one or more concrete layers disposed atop an underlying substrate layer formed of a substrate material, wherein a sink-accommodating opening passes through the laminate body for accommodating an undermount sink therein and at least a portion of each layer of the laminate body is visible at a perimeter of the sink-accommodating opening.

According to a fifth aspect of the invention there is provided a laminate concrete panel supported in an installed position atop a support structure to define a countertop or the like, the laminate concrete panel comprising a laminate body spanning an area bound by a plurality of perimeter edges of said laminate body, the laminate body comprising one or more concrete layers disposed atop an underlying substrate layer formed of a substrate material, wherein at least a portion of at least one of the layers of said laminate body is covered at a visually exposed one of said perimeter edge by a visually distinct covering material.

According to a sixth aspect of the invention there is provided a method of fabricating a laminate concrete panel for use as a countertop or the like, the method comprising the steps of:

(a) forming a laminate body comprising one or more concrete layers disposed atop an underlying substrate layer and spanning an area bound by a plurality of perimeter edges of said laminate body; and (b) leaving the substrate layer of the laminate in a state uncovered by the one or more concrete layers at one or more finished edges that are to be positioned at visible locations when the panel is installed; and (c) at least partially covering at least one of the layers at least one of the one or more finished edges with a visually distinct covering material.

According to a seventh aspect of the invention there is provided method of producing a laminate concrete panel for use as a countertop or the like, the method comprising:

(a) cutting a sheet of substrate material to a custom shape dictated by dimensions of a pre-existing support structure atop which the countertop or the like is to be mounted during installation;

(b) applying one or more concrete layers to the sheet of substrate material that has been cut to the custom shape; and (c) allowing the one or more concrete layers to cure in place atop the sheet of substrate material to form the laminate concrete panel, which includes the cut sheet of substrate material and the cured one or more concrete layers;

wherein steps (a), (b) and (c) are all performed at a fabrication site that is remote from an installation site at which the support structure resides.

Preferably step (b) comprises spraying the one or more concrete layers into place on the sheet of substrate material.

Aggregate material may be applied to an upper surface of the one or more concrete layers in a separate application step after the spraying of the one or more concrete layers.

Before step (b), an edge thickening strip of the substrate material may be attached to an underside of the sheet along a perimeter edge thereof to create an edge profile of the laminate concrete panel that has a greater thickness than a central area of said laminate concrete panel.

The edge thickening strip of the substrate material may be cut from the same sheet of substrate material to which the strip is attached in step (b), if the sheet sufficiently exceeds the dimensions of the pre-existing support structure.

Preferably attaching the edge thickening strip of the substrate material comprises adhering the edge thickening strip of the substrate material to the sheet.

Preferably step (b) comprises applying the one or more concrete layers in a manner at least partially covering the edge thickening strip.

The edge thickening strip has an outer side thereof that faces outwardly from under the sheet, and step (b) may comprise applying the one or more concrete layers in a manner leaving the outer side of the edge thickening strip at least partially uncovered by said one or more concrete layers so as to leave at least part of the edge thickening strip of substrate material visible at the edge profile of the laminate panel.

Step (b) may comprises applying the one or more concrete layers in a manner leaving an edge of the sheet at least partially uncovered by said concrete layers so as to leave said sheet and the one or more concrete layers at least partially visible at said edge to define visually contrasting layers of concrete and substrate material at a finished edge of the laminate concrete panel that will reside in a visible location when installed atop the support structure.

A visually distinct covering material may be applied over at least a portion of exposed layers of concrete and substrate material at a perimeter of the laminate concrete panel.

The cover material may be applied in a manner also covering a partial area of a topside of the one or more concrete layers to provide an accent area at said topside of the one or more concrete layers.

The method may include bending a sheet of the cover material to overlie both the partial area of the topside of the one or more concrete layers and the at least one of the one or more finished edges.

The cover material may be recessed into the topside of the one or more concrete layers to lie flush therewith.

The cover material may be applied in a removable manner, for example by magnetically attaching the cover material.

A backsplash strip of the substrate material may be cut and used to form an upright backsplash along a wall-adjacent edge of the laminate concrete panel that is faced toward a wall when the laminate concrete panel is installed on the support structure.

The wall-adjacent edge of the laminate concrete panel may follow a non-linear path, in which case installing the backsplash strip preferably comprises flexing the backsplash strip into a non-linear shape conforming to the non-linear path of the wall-adjacent edge, and fixing the strip in place in said non-linear shape.

The backsplash strip may be mounted atop the one or more concrete layers applied to the sheet in step (b) after said one or more concrete layers has hardened, in which case concrete may be applied to the backsplash strip prior to mounting thereof atop the one more or more concrete layers applied to the sheet in step (b).

Alternatively the backsplash strip may be mounted atop the substrate sheet prior to application of the one or more concrete layers in step (b), in which case step (b) preferably includes application of concrete to the backsplash strip in concert with application of the one or more concrete layers on the sheet of substrate material.

A portion of the backsplash strip may be left uncovered by concrete so as to provide visually exposed areas of the backsplash strip in the finished laminate concrete panel for visual contrast between said exposed areas of the backsplash strip and visually exposed concrete areas of the laminate concrete panel.

The visually exposed areas of the backsplash strip may be located on a top edge thereof that faces away from a topside of the one or more concrete layers on the sheet.

A front face of the backsplash that faces inwardly over the one or more concrete layers atop the sheet may be covered by another one or more layers of concrete.

Step (a) may include attaching multiple sheets of the substrate material together in edge-to-edge relationship with one another to form a collective sheet of sufficient size to accommodate one or more large dimensions of the support structure that exceed an individual size of the multiple sheets.

A seam-reinforcing strip of the substrate material may be coupled to an adjacent two sheets of the substrate material at an underside of said adjacent two sheets where respective edges of said two sheets abut against one another.

The method may include, before step (a), forming a template atop the support structure at the installation, in which case step (b) preferably comprises using the template to mark or cut the sheet of substrate material.

According to another aspect of the invention, there is provided a method of producing a laminate concrete panel for use as a countertop, the method comprising:

(a) cutting a flexible sheet of substrate material to a custom shape dictated by dimensions of a pre-existing support structure atop which the countertop is to be mounted during installation; and (b) with the flexible sheet of substrate material free of any molds or forms, spray applying a plurality of concrete layers to the flexible sheet of substrate material that has been cut to the custom shape, said plurality of concrete layers including a first concrete layer sprayed onto said flexible sheet of substrate material and one or more cover layers sprayed over the first concrete layer, said plurality of concrete layers having a total collective thickness less than the flexible sheet of substrate material and individual respective thicknesses that are each less than ⅛-inch, and each of said plurality of concrete layers comprising PVA (polyvinyl alcohol) fibers; and (c) allowing the plurality of concrete layers to cure in place atop the flexible sheet of substrate material to form a flexible laminate concrete panel, which includes the cut flexible sheet of substrate material and the cured plurality of concrete layers;

wherein steps (a), (b) and (c) are all performed at a fabrication site that is remote from an installation site at which the support structure resides.

BRIEF DESCRIPTION OF THE DRAWINGS

In the accompanying drawings, which illustrate exemplary embodiments of the present invention.

DETAILED DESCRIPTION

Figure 1:
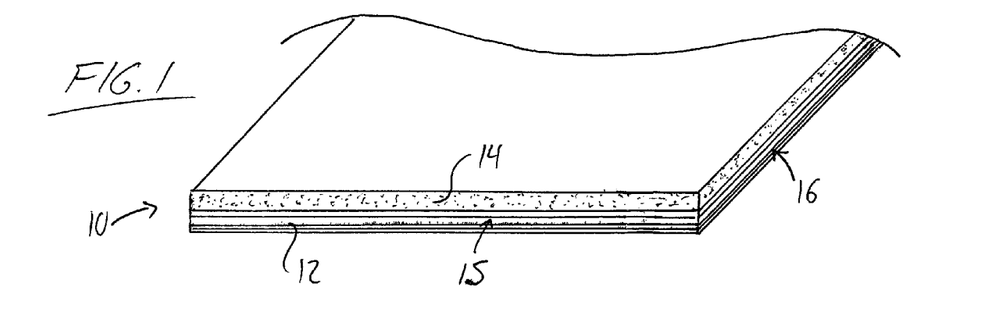
FIG. 1 is a perspective end view of a laminate concrete countertop of the present invention with uniform thickness over its full area.

FIG. 1 shows a first countertop 10 according to the present invention, which is in the form of a laminate body comprising a lower base or substrate layer 12 formed of plywood and defining an underside of the countertop, and an upper concrete layer 14 disposed atop the plywood substrate 12. The countertop 10 has a unique appearance over prior art concrete countertops in that the substrate layer 12 spans the full area of the countertop between all perimeter edges, whereby the visually distinct plywood and concrete layers remain visible at the edges of the finished countertop product, including at edges thereof that will be visible when the countertop installation is completed. For example, for a rectangular countertop extending along one wall and spanning fully between two walls that jut inward from the first wall, end edge 15 of FIG. 1 will abut up against one of the jutting walls and thus be concealed from sight, while front edge 16 will face outwardly away from the first wall and thus from the only visible edge in the final installed condition of the countertop. The visible contrast between the different materials of the layers in the countertop at the visible front edge thereof provide a unique aesthetic effect not provided by conventional concrete countertop solutions.

Figure 2:
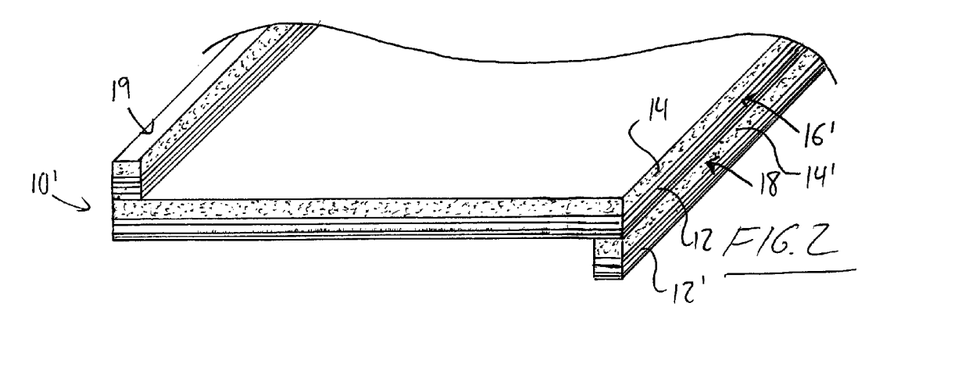
FIG. 2 is a perspective end view of a laminate concrete countertop of the present invention with a backsplash and a built-up front edge, each presenting an exposed face with a layered visual effect.

FIG. 2 shows a countertop 10' having the same two-layer plywood and concrete configuration as the FIG. 1 countertop over a substantial majority of the countertop's area, but having a built-up configuration with additional layers at the front edge. Like in other types of countertop, the resulting greater thickness at the visible finished edge of the countertop gives the impression of a greater countertop thickness without the added weight and excess material requirement of actually fabricating the countertop to such a thickness over its full area. In the present invention, the built-up edge is provided by bonding or otherwise fastening a multi-layer strip 18 to the underside of the substrate layer 12 at the edge thereof to run along the full length of this edge. The strip is cut from the same laminate piece that defines the planar top of the countertop, and thus has the same two-layer configuration in which concrete and plywood are layered one over the other.

In FIG. 2, the layers of the strip 18 are in the same orientation as in the rest of the countertop, with the concrete layer 14' of the strip 18 thus disposed atop the plywood layer 12' of the strip 18. Accordingly, the built-up front edge 16' of the countertop has four layers that alternate between concrete and wood, in the top to bottom order of concrete/wood/concrete/wood. In another configuration, the strip 18 may be mounted to the rest of the countertop in an inverted orientation relative to the remainder of the countertop, resulting in a top to bottom order of concrete/wood/wood/concrete. The visible contrast between the concrete and wood again gives a unique appearance to the built-up counter edge, but giving the impression of a thicker plywood layer disposed between top and bottom concrete layers.

FIG. 2 also illustrates the creation of a backsplash 19 in a manner similar to the built-up edge 16', by mounting a second strip 18' cut from the same laminate piece as the remainder of the countertop to the topside of the concrete layer 14 at the rear edge thereof. Cut from the same laminate piece, the second strip 18' has the same two layer configuration as the main area of the countertop and the undermounted strip 18 at the built-up front edge. The figure shows the second strip mounted in the same wood-down, concrete-up orientation as the main countertop area and the undermounted strip of the built-up front edge, but the second strip 19 may instead be inverted into a wood-up, concrete down orientation before adhesively mounting or otherwise fastening the second strip to the top of the concrete layer 14. The wood and concrete layers of the second strip are visible at the front side thereof that faces over the remaining of the countertop, thus creating a unique backsplash appearance. Multiple strips may be mounted one over the other at the rear edge of the countertop to define a backsplash of increased height and greater number of layers. Such backsplash strips may be mounted in all in a same orientation, or in different orientations to define different layering patterns at the backsplash.

Figure 4:
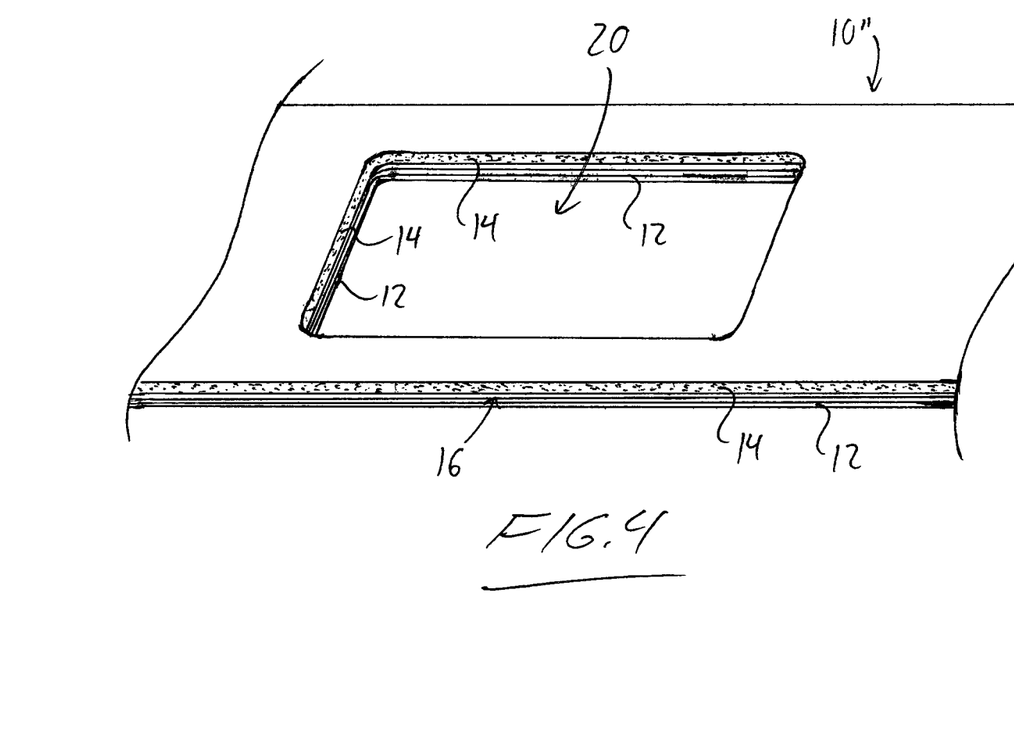
FIG. 4 is a front perspective view of a laminate concrete countertop of the present invention with an opening for an undermount sink.

Turning to FIG. 4, another countertop 10" features a sink opening 20 cut out therefrom a location spaced inward the perimeter of the countertop, and like at the outer perimeter edges of the counter top, the wood and concrete layers 12, 14 are left uncovered around the perimeter of the sink opening 20. Accordingly, if an undermount sink (not shown) is mounted to the underside of the substrate layer of the countertop, the wood and concrete layers remain unconcealed and fully visible around the full perimeter of the sink opening just above the sink basin(s), again providing a unique aesthetic appearance over prior art countertop solutions. In the figures, exposed edges of the concrete layers are shown with stippling to help aid in visual distinction of the illustrated plywood and concrete layers, and not necessarily to denote any particular textural or visual aspects that may or may not be present in an actual countertop fabricated in accordance with the present invention.

Figure 5:
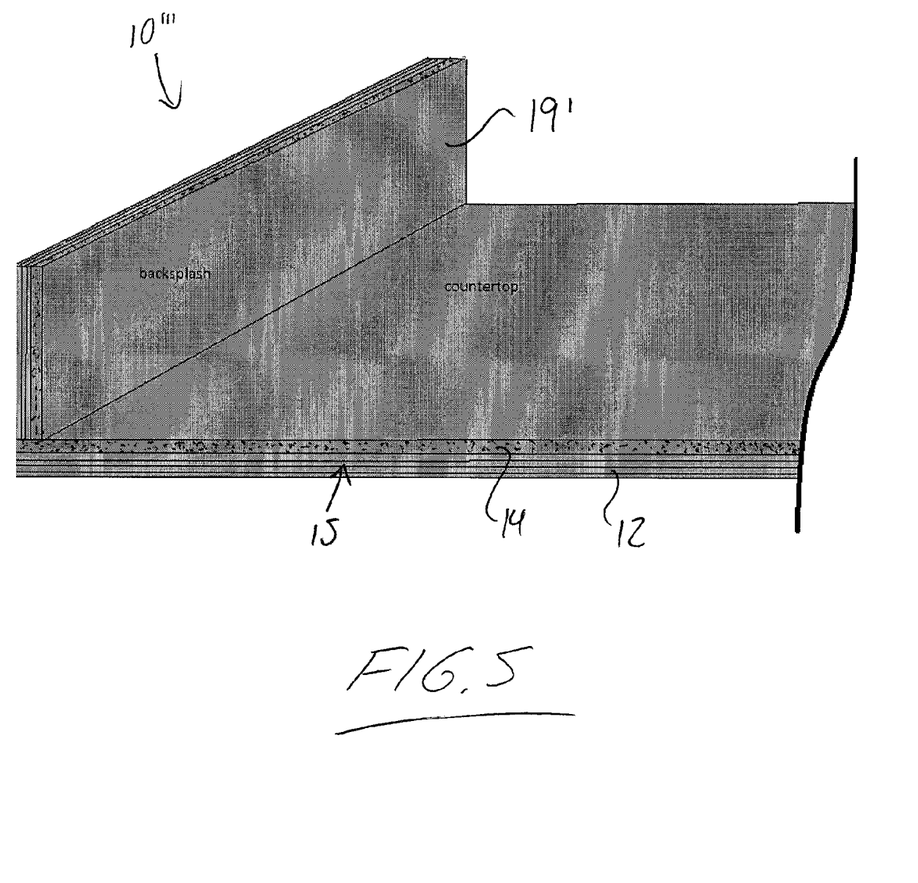
FIG. 5 is a perspective end view of a laminate concrete countertop of the present invention with an alternate style of backsplash.

FIG. 5 shows another countertop 10''' that has a backsplash feature 19' that is mounted in a different orientation than that of FIG. 2. This backsplash 19' is again formed by strip cut from the same type of laminate sheet that forms the main horizontal surface area of the countertop, but is a wider strip than in the countertop of FIG. 2, and is mounted in an upright orientation in which the concrete and plywood layers are in adjacent vertical planes, instead of horizontal planes. That is, the layers are disposed horizontally beside one another, not one atop the other. The concrete layer faces forwardly over the concrete layer 14 of the main area of the countertop, so that the visible front face of the backsplash 19' visually matches, or is similar to, the main countertop surface. The exposed top edge of the backsplash 19' displays the visually contrasting concrete and plywood layers of the backsplash, again providing a unique visual effect not seen in the prior art.

Turning now to the process for fabricating the forgoing countertops of the present invention, the process starts by laying out a plywood sheet horizontally on a suitable support surface to define the countertop substrate. Reference in made herein to use of 5 foot×12 foot or 5 foot×10 foot sheets of ¾-inch plywood for reasons referenced below, but it will be appreciated that other sizes may be used within the scope of the present invention.

Concrete is then applied to the substrate, for example by coating the plywood sheet with multiple thin coats of a high ratio acrylic polymer concrete, for example by spray-application of four coats, one at a time. These thin coats thus form sub-layers of the resulting overall concrete layer of the finished countertop product. Once the final coat has been sprayed, the concrete layer is then troweled in order to level out and smooth the top surface, and then allowed to cure, for example for 24-hours. In one embodiment, a 5-15 minute wait time is left between coats, and the final top coat is left for about 15-30 minutes before trowling. Longer wait times are possible, but less preferable, as excessive wait times between coats may lead to delaminating between the coats, as concrete bonds best to wet, uncured concrete.

Relatively thin coats have been used to create a relatively thin, veneer-like concrete layer of smaller thickness than the underlying substrate, with such prototypes of the invention featuring a concrete layer that is similar in thickness to a single ply of the plywood substrate, at a thickness of approximately ⅛-inch. With such a relatively thin, veneer-like concrete layer, use of ¾-inch plywood (which is typically about 23/32-inches in actual thickness), leads to a slab that is very close to an overall ¾-inch thickness. The built-up edge of conventional plastic laminate countertops of often 1.5-inch thick, and so the application of a single strip to the edge of the slab, as shown in FIG. 2, effectively doubles the countertop thickness at this built-up edge to a thickness closely following the conventional 1.5-inch edge thickness of a plastic laminate countertop. This way, the countertops are sure to be compatible with many kitchen cabinet configurations. Additional strips can be added to increase the built-up edge thickness to approximately 2.25-inches, 3-inches, etc.

It will be appreciated that the number of coats or sub-layers used to form the concrete layer may be varied, and the appropriate cure time may vary, for example according to the overall thickness of concrete applied over the substrate, which may also vary. Through the application and curing process, the concrete will automatically bind to the plywood substrate, thereby avoiding the need to perform a separate step of adhesively bonding plywood or other backing/substrate material to the concrete.

The concrete is sprayed onto the plywood substrate without use of any mold or form to create perimeter walls upstanding around the perimeter the plywood sheet, and any concrete that gets onto the edges of the substrate layer may later be grinded away. The use of a wood material for the substrate provides a notable visible contrast in terms of colour and visual texture, and allows use of wood stains to customize the colour of the substrate layer.

Figure 3A:
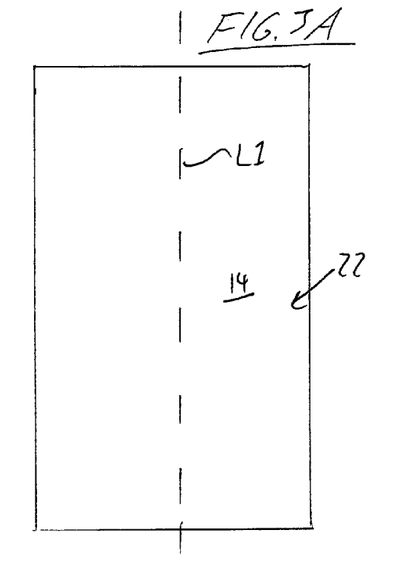
FIGS. 3A and 3B illustrate cutting steps in the process of fabricating the countertop of FIG. 2.

Once the concrete has fully cured, the resulting wood and concrete slab is then cut as required to the overall size and shape for the particular installation for which the countertop is intended. Referring to FIG. 3A, the wood and concrete slab 22 may be cut into two or more pieces, each intended for a different particular countertop. For example, using one of the aforementioned elongated rectangular plywood sizes with a 5-foot width, the slab may be cut lengthwise in half, as shown by cut line L1, thereby producing two smaller half-slabs 24 of equal-length and equal 30-inch width. This is particularly compatible with a countertop depth of 25.5-inches, as commonly used for many kitchen cabinet designs, where the two smaller slabs cut from the larger original slab are each sufficiently sized to at least span such a countertop depth, and still leave room to cut down each slab further if necessary or desired, due to the extra 9-inches of width in the original slab (4.5 inches per half-slab) beyond that which is needed for two 25.5-inch counters.

Figure 3B:
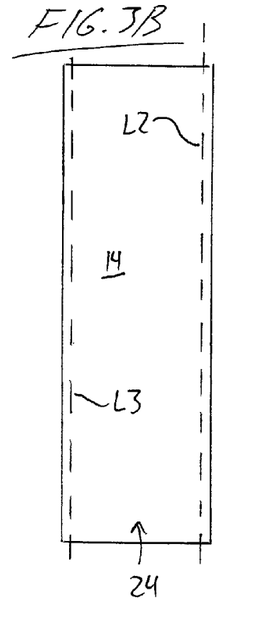

Referring to FIG. 3B, in order to create a built-up edge like that of FIG. 2, each half-slab may be cut down again a short distance inward from the edge to be built-up, or from another edge of equal or greater length thereto. For example, the half-slab 24 of FIG. 3B is cut in a lengthwise along cut line L2, a short distance inward from the original front edge of the half slab, thereby shifting the newly resulting front edge closer to the opposing parallel rear edge by the combined width of the cut-away strip and the cutting blade. Referring back to FIG. 2, the resulting strip 18 cut from the half slab 24 is then adhered to the underside of the plywood substrate to place an outer side of the strip 18 flush with the newly cut front edge of the half slab. For a built-up edge of even greater thickness, more than one strip may be cut from the half slab, and the strips than adhered one over the other to the underside of the main substrate layer. The strip used to form the built up edge may be 1-inch wide for example, but varying widths may be used provided that the countertop span is sufficient to create a large enough overhang past the respective edge of the cabinetry on which the countertop is to be mounted in order to accommodate the strip outward past the cabinet faces.

For a countertop where more than one edge will be visible in the final countertop installation, it will be appreciated that same edge-building process may be followed for any one or more visible edges of the finished product. For example, a rectangular countertop for a kitchen island may have built-up edges on all four sides, leaving a central rectangular area of reduced thickness inward from all four edge strips.

Referring again to FIG. 3B, the half slab 24 may be cut again along lengthwise cut line L3 a short distance inward from the rear edge of the half slab in order to separate another strip 19 to be used for the backsplash of FIG. 2, by mounting the strip in at the newly cut rear edge that has been offset from toward the now built-up front edge by the cutting of the second strip 19 from the half slab.

Larger countertops may be produced without cutting a slab down into smaller slabs for two or more different countertops, or smaller countertops may be produced with a 1:1 slab to countertop ratio by using smaller plywood sheets. Use of 5×12 plywood sheets provides a slab size commonly employed in fabrication quartz/granite countertops. Countertops of course may be cut into various shapes other than the simple rectangular shape shown in the drawings. If required, a sink opening may be cut into the slab at the prescribed location accordingly to the specifications of the particular countertop installation.

With the concrete cured and the slab cut to the appropriate final shape, the concrete is then polished to its desired sheen, both at the top surface that will define the countertop area, and at one or more of the perimeter edges, at least at the perimeter edges that will be exposed edges in the final countertop installation. Any imperfections are filled with concrete and then polished again. The exposed edges of the plywood substrate may be stained to provide a desired color or tone, just as known staining or dying techniques may be applied to the concrete to achieve a desired look at the upper surface thereof that forms the countertop area. When dry, the wood and concrete are then sealed, for example with a permanent penetrating, micro film building sealer. If a sink opening was cut or a backsplash installed, the finishing processes used at the finished outer perimeter edges will be likewise be applied at the sink perimeter and front face of the backsplash, although the finish work at the sink opening may not be necessary in instances where a top mount sink has been specified.

While the above process describes factory customization where the countertops are made to order based on specifications prescribed by the intended installation, other options may include non-custom fabrication, where slabs are shipped to retailers or installers for subsequent cutting to size according to end-user requirements, and possible further finishing steps. For example, a cured half-slab may be polished and sealed, and then shipped to a retailer that has appropriate cutting equipment to allow the retailer to cut the half-slab to the appropriate dimensions for a customer, for example to fit the customer's kitchen cabinets or bathroom vanity. Any freshly cut edges would then be sanded smooth, and then sealed with an appropriate sealant. Likewise, even when the final countertop is produced to customer specifications at the factory, the slab may be polished and sealed before cutting to the specifications, with subsequent sanding or polishing, and final sealing, of any cut edges then carried out before shipping or delivering to the customer.

In summary of the forgoing, the described panels useful for countertops or similar applications have a concrete layer only on the main topside surface of the plywood substrate, leaving the plys of the plywood exposed. This provides a unique look for the product line, which for example may be marketed as "fusion countertops" due to the visible combination of wood and concrete.

Figure 6:
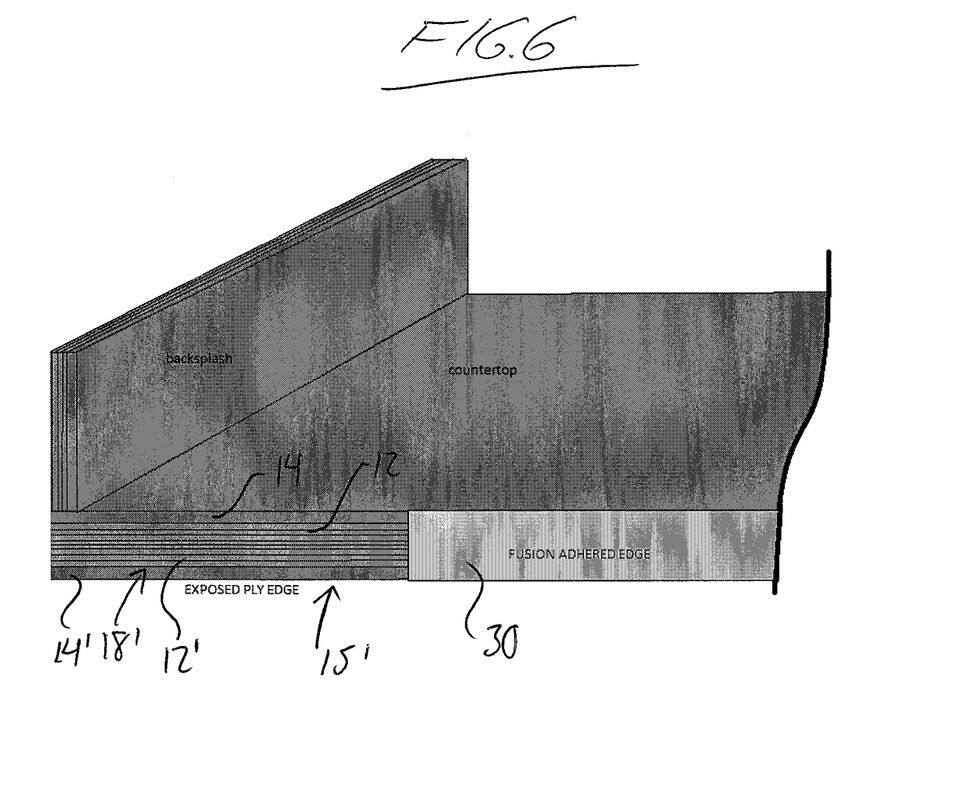
FIG. 6 is a perspective end view of a laminate concrete countertop of the present invention with an edge accent piece.

Turning now to FIG. 6, along with the forgoing embodiments with an exposed plywood edge, and the ability to add additional layers at one or more edge for a thicker profile, the present invention also incorporates the possibility of adhering various faces to the exposed edge of the countertop for customers who don't want the plywood layers visible, or to provide additional customization options for the customer.

Such "Fusion Edges" would feature various materials being applied to the final edge of the above described Fusion Countertops in any various number of ways to cover or conceal all or part of the otherwise exposed plywood and concrete edges. These cover materials are preferably thin, sheet-like materials or veneers that in some cases can even be bent or be folded, but can also include thicker faces of more solid materials. Possible covering materials include various types of steel, stone, plastic, glass, tile, wood, concrete, vinyl, fibreglass, acrylic, and may extend to other materials as well. These edge-finishing cover pieces can be nailed, screwed, glued, or epoxied in place for intended permanent installation, or even temporarily stationed by recessed magnets or magnetically attractable elements set into the Fusion Countertop edge. That is, if the covering material is a magnetically attractable metal, then magnets recessed or embedded in the plywood or concrete of the countertop edge can be used to attract the metal cover. If the covering material itself is not magnetically attractable, then magnets on or in one of the countertop and cover piece can interact with magnetically attractable elements embedded or recessed in, or mounted on, the other of the countertop and the cover piece.

These edge covering pieces could be applied in any orientation and position, including at sink cut-outs or backsplashes. The invention also allows Fusion Edge products to be incorporated into the surface of Fusion Countertops as accents or to tie in the edge to the face of the countertop.

FIG. 6 shows an end edge 15' of the countertop that has been increased in thickness by attachment of a concrete and plywood layered strip 18 to the underside of the main substrate layer 12 (in the inversed orientation of the edge strip 18 of FIG. 2, so as to create a three-layer effect with a 'double thickness' plywood layer sandwiched between two concrete layers). A rectangular piece 30 of covering material having a height equal to that of the thickened end edge 15' of the countertop, but a length less than that of the edge 15', has been adhered over the exposed face of this edge 15' to span the full height of the edge over a partial portion of its length. The covering piece, at least at the exposed face thereof facing outward from the countertop, visually contrasts both the concrete layer 14 and the plywood layer 12 of the countertop structure, thus introducing further variation of the aesthetic appearance of the countertop edge compared to conventional countertop designs.

In other embodiments, the covering piece 30 may cover the full length of the countertop edge, thus concealing the entirety of the both the concrete and plywood substrate layers. In another embodiment, the height of the covering piece may be less than that of the countertop edge, for example concealing only the concrete layer or only the plywood layer, or concealing only a partial height of one or both layers, or concealing the full height of one layer and a partial height of the other. As an alternative to opaque covering materials that conceal the underlying layers of the countertop edge, translucent covering materials (e.g. glass) may alternatively be used.

Figure 6A:
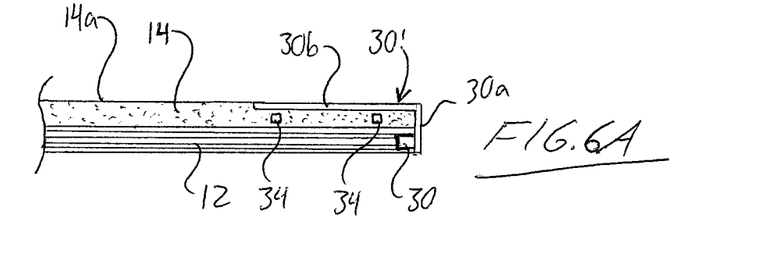
FIG. 6A is a cross-sectional view of a laminate concrete countertop with a magnetically secured edge accent piece of bent shape that overlies areas of both a perimeter edge and topside of the countertop.

As opposed to the 'edge only' covering piece 30 of FIG. 6 that is arranged to overlie only an edge portion of the countertop, other embodiments may feature a 'right angle' covering piece 30' with a vertical leg 30a that overlies the countertop edge and a horizontal leg 30b that overlies a partial area of the concrete topside of the counter, as shown in FIG. 6A. The horizontal leg thus provides an 'accented' area of the main countertop surface providing visual contrast with the fully exposed concrete of the remainder of this surface. Where the cover material is bendable, such a 'right angle' covering piece may be produced by bending a single integral sheet of the covering material.

With continued reference to FIG. 6A, in order to maintain a purely planar countertop, the topside 14a of the concrete 14 may be machined down over the selected area using suitable diamond tools to allow mounting of the horizontal leg 30b of the covering piece 30' in a recessed or inlaid position flush with the remainder of the main countertop surface. Likewise, if an edge-only piece or right-angle piece is to span only a partial portion of an edge of the countertop, the portion of the edge to be covered may be recessed in order to accommodate flush mounting of the edge-only piece or vertical leg of the right-angle piece. FIG. 6A also shows the recessing of one of more magnets 30 into the edge of the plywood, and embedding of one or more magnets 32 into the concrete 14 during the spraying operation, in order to magnetically secure the covering piece 30' in place on the finished countertop. With a magnetic or other removable attachment method, edge pieces of different colors, textures or materials can be swapped out for one other to allow the owner to reconfigure the countertop appearance over time.

As opposed to an L-shaped right angle piece with a single bend to span from the countertop edge to the main countertop surface, bent shapes of added complexity may be used, for example to span from the first bend at the main countertop edge, across the topside of the countertop to a second bend, and up the face of the backsplash, and even from a third bend at the top of the backsplash face onto a top edge of the backsplash.

"Fusion Edges" would preferably be sealed to prevent water, cleaners, food, etc. from becoming trapped between the Fusion Edge and the countertop causing mold growth or other issues. If the edge pieces are permanently mounted, the sealant may be applied after installation of the edge pieces so as to seal not only the edge piece themselves, but also the joints found between the edge pieces and the main countertop structure. If the edge pieces are removably installed, for example using magnetic mounts, then the sealant may be applied to the edge pieces separately of the countertop. Full cleaning of the countertops would involve removal of the edge pieces for cleaning of these pieces and the normally-covered edge of the main countertop structure. "Fusion Edges" may be selected and installed at the factory level during initial fabrication, or may alternatively be applied at a retail or installation level.

The above description outlines manufacture of countertops by spraying the concrete on the sheet of substrate material and subsequently cutting the resultant unit down to the customized dimensions prescribed by the requirements of a particular installation. However, an alternate fabrication process according to another embodiment of the present invention is also outlined as follows.

The process starts by first creating a template of the countertop space located atop the customer's cabinets at the installation site. This templating of the cabinets may be performed by the customer, the fabricator, or an installer acting as an intermediary between the two. The template process allows the determination of a true line for the wall and dimensions needed for that project. The template may thus define the length and width needed for a particular countertop, and the contours of any wall surfaces against which the countertop will abut when installed, whereby a tight conforming fit can be achieved between these wall-facing countertop edges and the wall surfaces in question.

Figure 7:
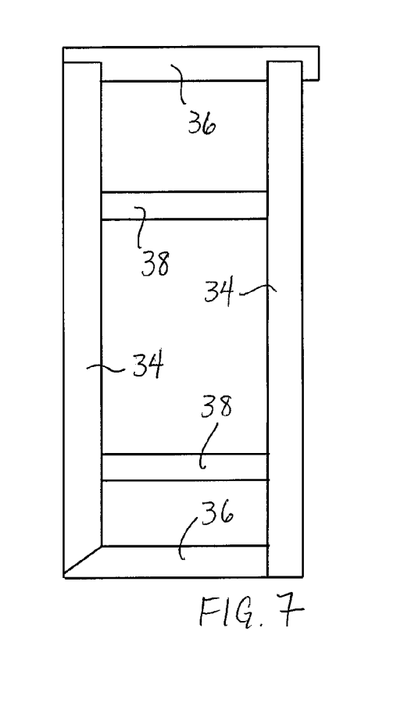
FIG. 7 shows a countertop template used as a cutting guide in an alternate fabrication process for customized laminate concrete countertops of the present invention.

Such templating is a well known practice in the countertop industry, and typically involves laying out of relatively narrow elongated strips of door skin or other thin material along edges of an existing countertop that is being replaced with the new concrete countertop, or along the perimeter boundaries of the top end of newly installed cabinets awaiting a countertop of the present invention. For a generally rectangular countertop space, four such strips 34, 36 of template material are laid out along the perimeter edges of the existing countertop or cabinet area and are adhered together to form the template outline. Additional reinforcement strips 38 are typically laid out across the space between two longer edge strips 34 and adhered thereto so as to lie generally parallel to the two shorter edge strips 36 at spaced apart locations therebetween to help maintain the overall shape of the template outlined. FIG. 7 shows such a template 40 produced in accordance with this conventional method.

Figure 8:
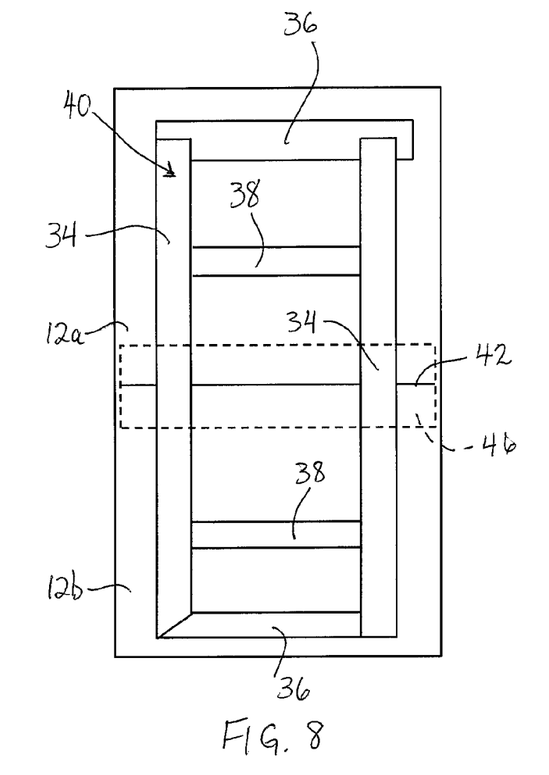
FIG. 8 shows placement of the countertop template of FIG. 7 atop a multi-sheet core of substrate material for cutting of the core into a customized sized and shape prior to application of concrete to the core.

With reference to FIG. 8, the template is then placed atop one or more sheets of template material, which still be used to form a custom 'core' of the countertop and again may be 4×8-foot sheets of ¾-inch plywood. As shown, if the length of the template exceeds the length of a single sheet of substrate material, two sheets 12a, 12b may be abutted together edge-to-edge and joined together at this resulting seam 42 to form a larger overall collective sheet of the core.

Figure 9:
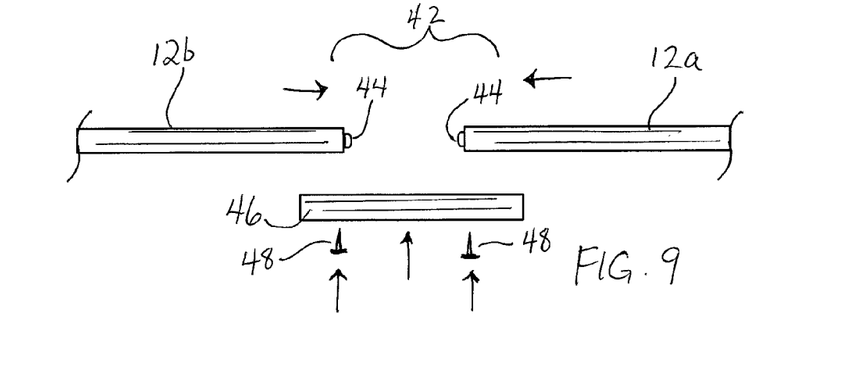
FIG. 9 is an exploded edge-on view of the multi-sheet core of FIG. 8, illustrating joining of two sheets of substrate material to form a larger collective sheet of the countertop core.
Figure 10:
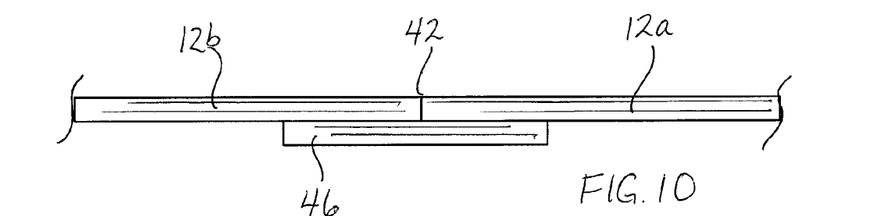
FIG. 10 illustrates the finished joint assembled in accordance with FIG. 9.

Turning to FIGS. 9 and 10, the seam where the two pieces of the surface core are joined together may be adhered together with a construction grade adhesive 44 (such as PL Premium), and an additional piece of the same substrate material 46, e.g. ¾-inch plywood, is installed beneath the seam with a width lying across the seam and a length cut to match that of the seam. This joint piece 46 may be two feet wide for example, so as to overlap each of the two abutted pieces by one foot each. The joint piece 46 is layered with an application of construction adhesive 44 on one of the two flat faces of the joint piece, which is then placed against the flat undersides of the two seamed together core sheets 12a, 12b. The term underside is used here to denote the side of the core sheets that will face downward when the finished countertop is installed, and may actually be the upward facing side of the core pieces during the described attachment of the joint piece. Fasteners, for example screws 48, are driven through the joint piece 46 into the underside of the seamed together core sheets 12a, 12b. The joint piece 46 thus strengthens the seam 42 between the two core sheets 12a, 12b.

Figure 11:
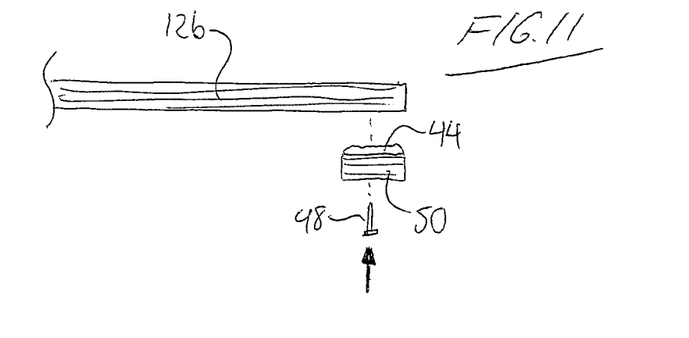
FIG. 11 illustrates installation of an edge strip of substrate material to the underside of the collective cores sheet of FIG. 8 for use in creating a built-up edge profile of the countertop.

With reference to FIG. 11, narrow strips 50 of the substrate material, for example 3-inch wide strips of the ¾-inch plywood, are cut and applied along any of the edges of the collective sheet that are intended to have a built-up edge profile, for example by use of construction adhesive 44 and fasteners 48 to secure the strips to the underside of the one or more core sheets 12a, 12b in the same manner as the joint piece 46. Using the described ¾-inch sheet material, this results in a 1.5-inch edge profile thickness, but alternate thicknesses of material may be used, and more than one strip may be stacked along the edge of the collective core sheet. For an island countertop, the strips are installed around the full perimeter of the collective core sheet to define a thickened edge profile around the full island. For other countertops, the strip(s) may be mounted only at select sides of the sheet that will define exposed edges of the final countertop installation. In other cases, if no built-up edge profile is required, the step of applying the underside edge strip(s) may be omitted from the fabrication process. Where one or more underside edge strips are installed using adhesive, the core is left sitting for a period of time, for example twenty-four hours or more, to allow the adhesive to cure. If the sheet dimensions sufficiently exceed the template dimensions, the edge strip may be cut from the same sheet to which it is to be attached.

With the core now completed, it is ready to be prepped in anticipation of subsequent application of concrete to same. The core's top surface and exposed perimeter edges (at least any edges requiring an application of concrete) are sanded, for example with an aggressive 30 grit disc, and any sharp edges are preferably routered for an eased, rounded or gradual edge corner.

Figure 12:
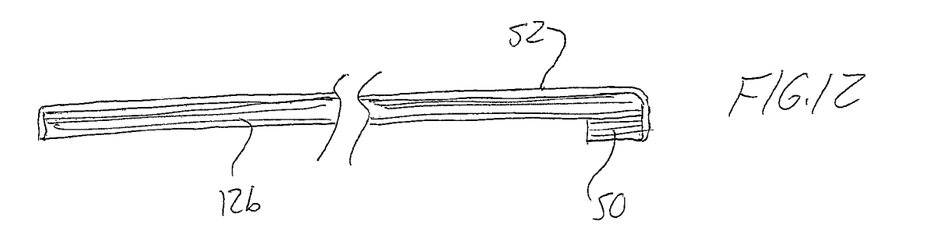
FIG. 12 illustrates application of a first pre-spray layer of concrete to the core of FIG. 11.

A mix of concrete prepared for use in a first-coat spray application is referred to herein as a 'pre-spray' concrete mix, and is prepared at this point in the process in preparation for application of this mix to the core. The entire surface of the core is saturated with water to increase the bond for the concrete. The concrete 'pre-spray' is then sprayed evenly over the entire surface and any exposed edges of the core that require concrete coverage. Referring to FIG. 12, this first-coat or 'pre-spray' 52 is then allowed to cure, for example being allowed to sit undisturbed for a twenty-four hour period.

After the sufficient cure time has expired, the cured coat of pre-spray is then ground down, for example with a 50 grit diamond polishing pad, in order to even out the top surface of this first concrete layer.

Figure 13:
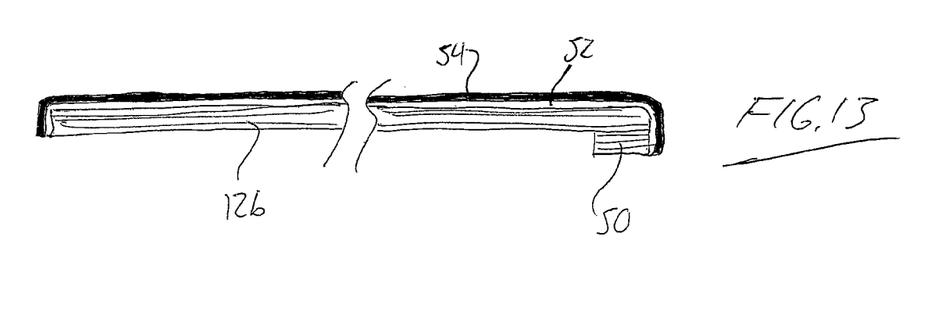
FIG. 13 illustrates application of a first color-concrete cover layer overtop of the first pre-spray layer of FIG. 12.

Next, another concrete mix is prepared, and for example may be a colored concrete mix. Once the surface of the pre-spray layer is polished evenly, and the specifically colored concrete is prepared, the surface is saturated again with water and the first layer of the colored concrete is applied in the same manner as the 'pre-spray' coat. With reference to FIG. 13, this first colored layer 54 is then allowed to cure, for example for twelve to twenty four hours, before being lightly polished, for example with a 50 grit diamond polisher in the same manner as pre-spray was polished.

Figure 14:
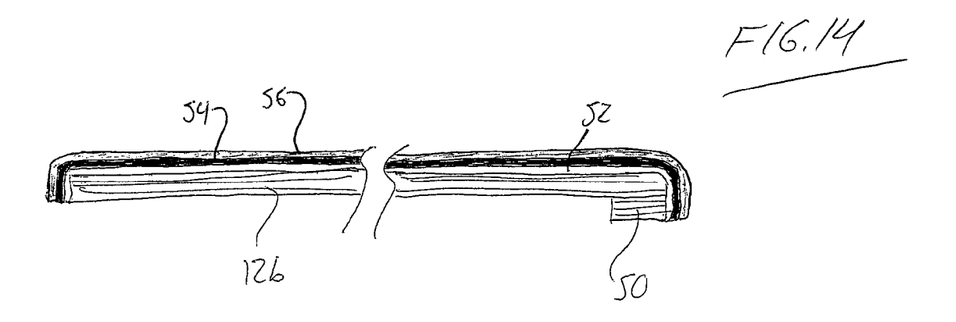
FIG. 14 illustrates application of a second color-concrete cover layer overtop of the first color-concrete cover layer of FIG. 13.
Figure 15:
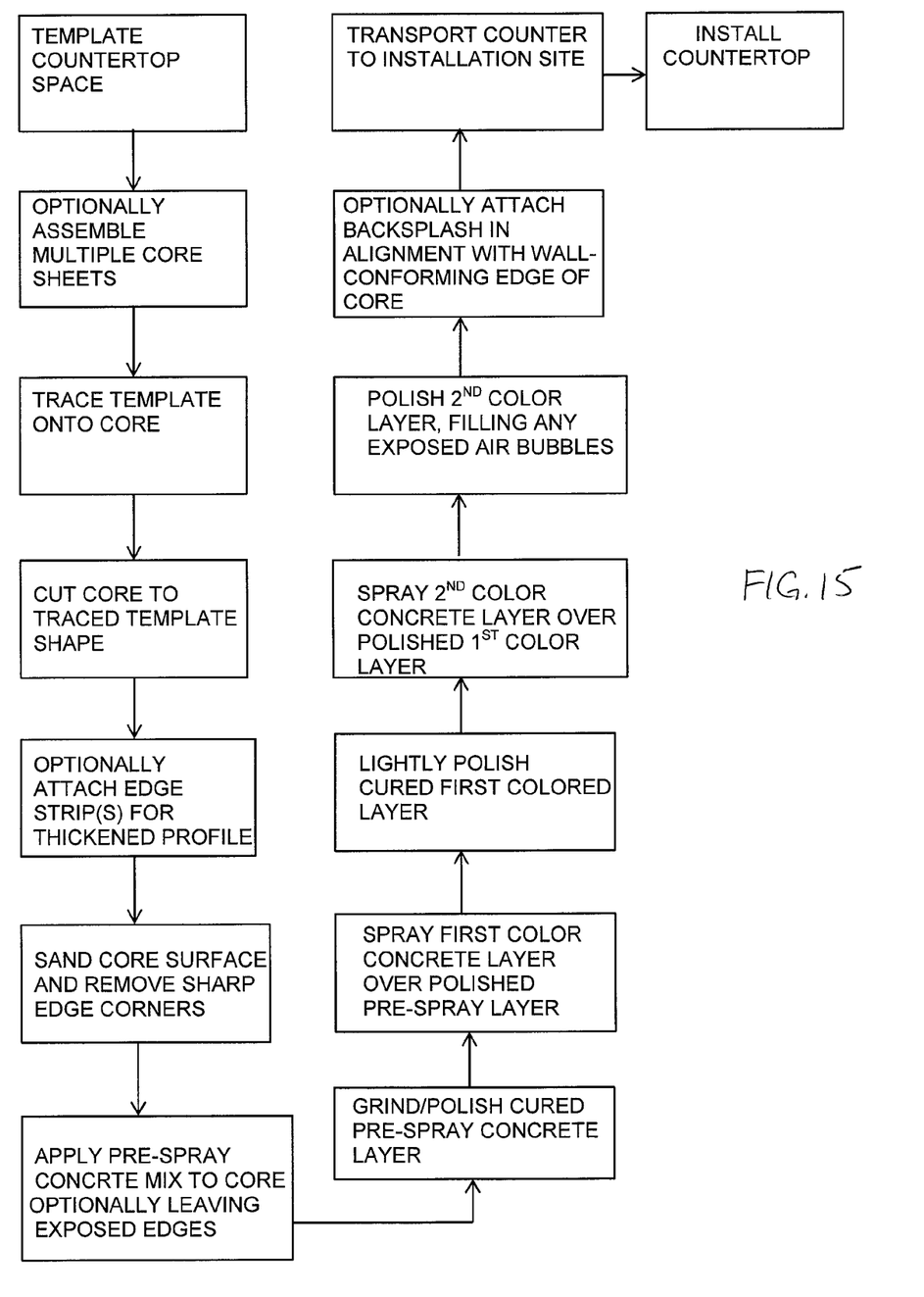
FIG. 15 is a flowchart illustrating an overall countertop fabrication process including the steps illustrated in FIGS. 7 through 14.

After that, a second layer 56 is applied in the same manner, and may be in the same color as the first colored layer, or with a different color depending on the look desired, as shown by contrast between the two colored layers 54, 56 in FIG. 14. Once the second layer is applied, it is then troweled smooth and allowed to cure, for example for twenty-four hours or more, before the final polishing stage begins. The final polishing starts with a relatively aggressive or course grit, for example 50 grit, and goes up to a finer grit, for example to a 200 grit if topical sealers are to be used, or up to 3500 grit when using penetrating sealers.

During this final polish, small air bubbles may be exposed and need to be filled to ensure a smooth finish. In such an instance, these holes can be filled with the same concrete mix as the colored concrete, but preferably without sand or fibers in the mix so as to ensure it can full small holes.

Once all the holes are filled and the surface and edges are polished as high as needed, the resulting one-piece countertop may be cut into separate pieces if seams are needed for transport or installation purposes. If the cupboard or cabinet layout for the particular installation requires multiple pieces, e.g.—on either side a stove or an island top, those pieces are templated and manufactured separately. If cutting of the one-piece countertop product is required, a two-step cutting process may be used, involving a first cut or score through the concrete layers with a diamond blade, and cutting of the wooden core with a wood cutting blade.

Once cut, if necessary, the counter is then sterilized, for example with methyl hydrate, and at this stage is now ready for sealer. When applying a topical sealer, the sealer may be sprayed with an airless sprayer or an HVLP (high volume, low pressure) automotive paint gun, or applied via microfiber roller. When applying a penetrating sealer, the sealer is then poured on the surface, and spread around to ensure deep saturation, then any excess sealer is wiped off.

The product, whether one or more countertop units, is then transported and installed on site and fastened down to the cabinets with screws driven into the underside of the wood core from inside the cabinets. Any seams that may be present due to use of two countertop units abutted up against one another are fastened together (e.g. using a joint strip in the same manner described above for joining two substrate sheets before the concrete application steps for a large countertop area), and filled with a color matching epoxy to match the topside of the concrete. The epoxy may be a clear, two part mixture that is also added with the dry mix ingredients of the color concrete used for that project. The dry mix may consist of Portland cement, Pozzlans and Pigment to ensure an accurate color match. The same seam-filling process may be used with clear silicone instead of epoxy for gaps larger than ⅛".

Tested concrete mixes found to be effective for the pre-spray and subsequent cover layers of concrete are outlined as follows, although the particular ingredients and ratios may be varied without departing from the scope of the present invention. The tested mixes employ 150 grams of Portland cement per square foot of countertop area for the pre-spray mix, and 300-400 grams of Portland cement per square foot of countertop area for the colored concrete cover layers, which breaks down to 150-200 grams per cover layer. Referring to the combination of pozzlan and Portland cement as "the cementitious ingredients", a sand component of the mix is equal in weight to the cementitious ingredients. Water is 20%-24% of the cementitious weight, polymer is 20% of the cementitious weight, PVA fibers are 0.05% of the cementitious weight, and Pigment is 0.01%-8% of the cementitious weight.

While the forgoing fabrication describes the application of two colored covering layers, alternate embodiments may feature the application of only a single cover layer overtop of the pre-spray layer. Use of two color layers allows for an added textured look, or contrasting colored layers. The final upper-most concrete layer may be either troweled smooth, as described above, or alternatively may have aggregate material (s) added after the spray application in order to provide a textured finish or ornamental effect. It will be appreciated this top-coat aggregate material is separate from the 'aggregate' component of the concrete mix. This top coat aggregate may be an aggregate material that is unsuitable or incapable of spray application with the concrete itself.

A backsplash may be added to a countertop produced by this method in the same manner as previously described above for the other fabrication method, and the backsplash may or may not have an edge or face at which the substrate and concrete layers are fully or partially exposed for a visually contrasting effect. That is, concrete may be applied to a backsplash strip of substrate material in a manner fully covering the final top edge and front face of the backsplash that respectively face upwardly away from and inwardly over the topside of the main countertop area. Alternatively, the backsplash concrete may be applied in a manner leaving all or part of these backsplash front or top areas exposed. If the sheet dimensions sufficiently exceed the template dimensions, the backsplash strip may be cut from the same sheet to which it is to be attached As the wood core of the countertop is cut according to a template of the desired counter space, the edge of the core sheet(s) along which the backsplash is installed may not extend in a purely linear manner as a result of variations of the wall surface against which this countertop edge and backsplash is destined to abut, as wall surface are typically not truly planar in form. The backsplash described herein, with a plywood strip forming the core or base of the backsplash, and one or more thin concrete layers sprayed on the plywood strip, may have sufficient flexibility that it can be flexed into a non-planar configuration conforming to the non-linear extent of the countertop edge. The backsplash is then adhered or otherwise attached while held in this edge-conforming state (for example, by suitable clamps spaced along the length the backsplash and core edge) so that the countertop edge and backsplash will accurately follow the wall surface once installed, thereby avoiding unsightly gaps between the wall and backsplash along this wall-facing edge of the countertop.

As an alternative to attaching a separately-fabricated pre-finished backsplash to the top surface of the concrete layer(s) on the main core sheet(s) of the countertop, the backsplash strip of substrate material may be attached to the main core sheet(s) before any concrete is applied to either, whereby the backsplash concrete can be spray applied in the same process as the main countertop area. In this case, the flexibility of the plywood allows it to be flexed into conformance with the edge of the main core sheet(s) that will face the wall in the final installation, and the backsplash strip is adhered to the core sheets in this conforming position before any concrete is applied.

The concrete layers may be applied to the wooden core in manner leaving all or part of the topside concrete layers and the wooden substrate exposed at one or more edges that will be visible finished edges in the final countertop, thus providing the same visual-contrast effect at these edges as described in relation to the embodiments of FIGS. 1, 2 and 4. Likewise, covering pieces may be used on countertops produced by this method, just like the covering pieces described in relation to FIG. 6. Alternatively, the second fabrication process involving on-site templating of the countertop space and subsequent off-site core customization and concrete application may be used to produce a countertop in which all exposed surfaces of the final installed countertop feature full concrete coverage of the wooden core.

While described for countertops to be installed atop cabinets or vanities, it will be appreciated that the panels of the invention may be mounted atop other supporting structures or frames, for example to form workbenches, tables, furniture, with concrete work or support surfaces.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A method of producing a laminate concrete panel for use as a countertop, the method comprising:
    (a) cutting a flexible sheet of substrate material to a custom shape dictated by dimensions of a pre-existing support structure atop which the countertop is to be mounted during installation; and (b) with the flexible sheet of substrate material free of any molds or forms, spray applying a plurality of concrete layers to the flexible sheet of substrate material that has been cut to the custom shape, said plurality of concrete layers including a first concrete layer sprayed onto said flexible sheet of substrate material and one or more cover layers sprayed over the first concrete layer, said plurality of concrete layers having a total collective thickness less than the flexible sheet of substrate material and individual respective thicknesses that are each less than 1/8-inch, and each of said plurality of concrete layers comprising polyvinyl alcohol fibers; and (c) allowing the plurality of concrete layers to cure in place atop the flexible sheet of substrate material to form a flexible laminate concrete panel, which includes the cut flexible sheet of substrate material and the cured plurality of concrete layers;

wherein steps (a), (b) and (c) are all performed at a fabrication site that is remote from an installation site at which the support structure resides.

2. The method of claim 1 comprising applying aggregate material to an upper surface of the one or more cover layers in a separate application step after the spraying of the plurality of concrete layers.

3. The method of claim 1 comprising, before step (b), attaching an edge thickening strip of the substrate material to an underside of the flexible sheet along a perimeter edge thereof to create an edge profile of the flexible laminate concrete panel that has a greater thickness than a central area of said flexible laminate concrete panel, wherein the edge thickening strip has an outer side thereof that faces outwardly from under the flexible sheet, and step (b) comprises applying the plurality of concrete layers in a manner leaving the outer side of the edge thickening strip at least partially uncovered by said plurality of concrete layers so as to leave at least part of the edge thickening strip of substrate material visible at the edge profile of the flexible laminate panel.

4. The method of claim 3 comprising applying a visually distinct covering material over at least a portion of exposed layers of concrete and substrate material at a perimeter of the flexible laminate concrete panel.

5. The method of claim 1 wherein step (b) comprises applying the plurality of concrete layers in a manner leaving an edge of the flexible sheet at least partially uncovered by said plurality of concrete layers so as to leave said flexible sheet and the plurality of concrete layers at least partially visible at said edge to define visually contrasting layers of concrete and substrate material at a finished edge of the flexible laminate concrete panel that will reside in a visible location when installed atop the support structure.

6. The method of claim 1 comprising cutting a backsplash strip of the substrate material and using said backsplash strip to form an upright backsplash along a wall-adjacent edge of the flexible laminate concrete panel that is faced toward a wall when the flexible laminate concrete panel is installed on the support structure.

7. The method of claim 6 wherein the wall-adjacent edge of the flexible laminate concrete panel follows a non-linear path, and installing the backsplash strip comprises flexing the backsplash strip into a non-linear shape conforming to the non-linear path of the wall-adjacent edge, and fixing the strip in place in said non-linear shape.

8. The method of 6 comprising mounting the backsplash strip atop the plurality of concrete layers applied to the flexible sheet in step (b) after said plurality of concrete layers has hardened.

9. The method of any of claim 8 comprising applying concrete to the backsplash strip prior to mounting thereof atop the plurality of concrete layers applied to the sheet in step (b).

10. The method of claim 6 comprising leaving at least portion of the backsplash strip uncovered by concrete so as to provide visually exposed areas of the backsplash strip in the laminate concrete panel for visual contrast between said exposed areas of the backsplash strip and visually exposed concrete areas of the flexible laminate concrete panel.

11. The method of claim 10 wherein the visually exposed areas of the backsplash strip are located on a top edge thereof that faces away from a topside of the plurality of concrete layers on the flexible sheet.

12. The method of claim 11 wherein a front face of the backsplash that faces inwardly over the plurality of concrete layers atop the flexible sheet is covered by another one or more layers of concrete.

13. The method of claim 1 wherein step (a) comprises attaching multiple sheets of the substrate material together in edge-to-edge relationship with one another to form a collective sheet of sufficient size to accommodate one or more large dimensions of the support structure that exceed an individual size of the multiple sheets.

14. The method of claim 13 comprising coupling of a seam-reinforcing strip of the substrate material to an adjacent two sheets of the substrate material at an underside of said adjacent two sheets where respective edges of said two sheets abut against one another.

15. The method of claim 1 comprising, before step (a), forming a template atop the support structure at the installation, and step (b) comprises using the template to mark or cut the flexible sheet of substrate material.

16. The method of claim 1 wherein the total collective thickness of the plurality of concrete layers does not exceed 1/8-inch.

17. The method of claim 1 wherein the substrate material is plywood.

* * * * *